US012294179B2

(12) United States Patent
Kirchhofer et al.

(10) Patent No.: US 12,294,179 B2
(45) Date of Patent: May 6, 2025

(54) PLUG-IN CONNECTOR ARRANGEMENT AND ELECTRICAL PLUG-IN CONNECTOR

(71) Applicant: Rosenberger Hochfrequenztechnik GmbH & Co. KG, Fridolfing (DE)

(72) Inventors: Sebastian Kirchhofer, Waging am See (DE); Markus Schichl, Seekirchen (AT); Levente Schneider, Fridolfing (DE)

(73) Assignee: Rosenberger Hochfrequenztechnik GmbH & Co. KG, Fridolfing (DE)

( * ) Notice: Subject to any disclaimer, the term of this patent is extended or adjusted under 35 U.S.C. 154(b) by 333 days.

(21) Appl. No.: 17/791,271

(22) PCT Filed: Jan. 5, 2021

(86) PCT No.: PCT/EP2021/050063
§ 371 (c)(1),
(2) Date: Jul. 7, 2022

(87) PCT Pub. No.: WO2021/140091
PCT Pub. Date: Jul. 15, 2021

(65) Prior Publication Data

US 2023/0352874 A1 Nov. 2, 2023

(30) Foreign Application Priority Data

Jan. 9, 2020 (EP) .................................... 20150823

(51) Int. Cl.
*H01R 13/62* (2006.01)
*H01R 13/629* (2006.01)
*H01R 24/40* (2011.01)

(52) U.S. Cl.
CPC ....... *H01R 13/6205* (2013.01); *H01R 13/629* (2013.01); *H01R 24/40* (2013.01)

(58) Field of Classification Search
CPC .. H01R 13/6205; H01R 13/629; H01R 24/40; H01R 13/73; H01R 13/6456; H01R 13/6315

(Continued)

(56) References Cited

U.S. PATENT DOCUMENTS 5,071,364 A * 12/1991 Bourgie ............... H01R 13/641 439/248
5,344,332 A * 9/1994 Lopez ................ H01R 13/6315 29/854

(Continued)

FOREIGN PATENT DOCUMENTS

DE 102010022987 A1 12/2011
DE 112010005657 T5 3/2013

(Continued)

*Primary Examiner* — Alexander Gilman
(74) *Attorney, Agent, or Firm* — Dickinson Wright PLLC

(57) ABSTRACT

The invention relates to a plug-in connector arrangement (1), having a first fastening element (5) that can be mounted on an assembly (2, 4) and having an electrical plug-in connector (7) that is connected to the first fastening element (5). Provision is made for the plug-in connector (7) to be connected to the first fastening element (5) in such a way that the plug-in connector (7) can be moved along at least one degree of freedom in translational movement (x, y, z). The plug-in connector (7) has a first guide means (14) in order to provide, together with an electrical mating plug-in connector (8), approximate guidance which positions the plug-in connector (7) and the mating plug-in connector (8) relative to one another in order to be plugged together.

16 Claims, 7 Drawing Sheets

(58) Field of Classification Search
USPC ............................................................ 439/39
See application file for complete search history.

(56) References Cited

U.S. PATENT DOCUMENTS

| | | | | |
|---|---|---|---|---|
| 5,605,150 | A * | 2/1997 | Radons | H01R 13/6315 439/247 |
| 6,155,857 | A * | 12/2000 | Kato | H01R 13/74 439/247 |
| 6,739,893 | B2 * | 5/2004 | Hallitschke | H05K 5/0069 439/248 |
| 6,767,244 | B2 * | 7/2004 | Saito | H01R 13/73 439/716 |
| 6,808,409 | B2 * | 10/2004 | Held | H01R 12/7005 439/378 |
| 7,914,318 | B2 * | 3/2011 | Stevenson | H01R 13/631 439/378 |
| 8,602,358 | B2 * | 12/2013 | Pladeck | B64D 13/00 244/131 |
| 9,425,551 | B2 * | 8/2016 | Chen | H01R 13/631 |
| 9,527,394 | B1 * | 12/2016 | Tang | B60W 10/26 |
| 10,177,496 | B2 * | 1/2019 | Czech | H01R 13/6315 |
| 11,527,841 | B2 * | 12/2022 | Bachmann | B65G 47/912 |
| 2009/0137145 | A1 * | 5/2009 | Arts | H01R 13/748 439/578 |
| 2009/0221154 | A1 * | 9/2009 | Hartlef | H01R 13/6315 439/39 |
| 2013/0078844 | A1 * | 3/2013 | Eusterholz | H01R 9/18 439/362 |
| 2016/0049738 | A1 * | 2/2016 | Pari | H01R 9/18 439/578 |
| 2016/0127643 | A1 * | 5/2016 | Huerta | H01F 7/0252 439/8 |
| 2017/0271817 | A1 * | 9/2017 | Pickel | H01R 13/6315 |
| 2017/0317444 | A1 * | 11/2017 | Narayanasamy | H01R 13/6205 |
| 2018/0159275 | A1 * | 6/2018 | Mühlfellner | H01R 24/38 |
| 2019/0207293 | A1 * | 7/2019 | Fleancu | H01Q 1/246 |
| 2019/0312381 | A1 * | 10/2019 | Troufflard | H02J 7/0045 |
| 2021/0226390 | A1 * | 7/2021 | Blakborn | H01R 13/512 |
| 2023/0352874 | A1 * | 11/2023 | Kirchhofer | H01R 24/40 |

FOREIGN PATENT DOCUMENTS

| | | | |
|---|---|---|---|
| DE | 202015003177 | U1 | 5/2015 |
| EP | 0794594 | A2 | 9/1997 |
| EP | 3340394 | A1 | 6/2018 |
| JP | 2010118224 | A | 5/2010 |
| SU | 1072159 | A1 | 2/1984 |

* cited by examiner

PLUG-IN CONNECTOR ARRANGEMENT AND ELECTRICAL PLUG-IN CONNECTOR

CROSS-REFERENCE TO RELATED APPLICATIONS

This application is a U.S. National Stage of International Application No. PCT/EP2021/050063, filed on Jan. 5, 2021, which claims the benefit and priority of European Patent Application No. 20150823.1, filed on Jan. 9, 2020, the entire contents of which are incorporated herein by reference.

The invention relates to a plug-in connector arrangement, having a first fastening element that is able to be assembled on an assembly, and having an electrical plug-in connector that is connected to the first fastening element, according to the preamble of claim 1.

The invention furthermore relates to an electrical plug-in connector for a plug-in connector arrangement.

A multiplicity of electrical plug-in connectors are known in the field of electrical engineering. As is known, electrical plug-in connectors serve for transmitting electrical supply signals and/or data signals to corresponding mating plug-in connectors. A plug-in connector or mating plug-in connector, respectively, can be a plug, an installation plug, a socket, a coupling, or an adapter. The term “plug-in connector” or “mating plug-in connector” used within the scope of the invention represents all variants.

A plug-in connection between a plug-in connector and a corresponding mating plug-in connector in many applications has to be established “blindly”. To this end, it is known for the plug-in connector within a specific positioning region to first be positioned in a preliminary manner relative to the mating plug-in connector. Unless the central axis of the plug-in connector and the central axis of the mating plug-in connector are in mutual alignment when the plug-in connection is established, the plug-in connector and/or the mating plug-in connector first have/has to be tilted. While the plug-in connection is being fully closed, the plug-in connector or the mating plug-in connector respectively, is positioned fully upright again until both central axes run coaxially.

Blindly plug-fitting a plug-in connection is thus typically indeed possible, but requires the potential for the plug-in connector and/or the mating plug-in connector to be tilted, which cannot always be implemented for reasons of construction.

Furthermore, the contacts of the plug-in connector and the mating contacts of the mating plug-in connector during a blind plugging-in procedure during the plug fitting are at times highly mechanically stressed by virtue of said contacts being inaccurately positioned and oriented relative to one another. In particular in the case of applications which require frequent plugging-in and unplugging, the lifespan of the plug-in connection can be significantly reduced as a result.

In view of the known prior art, the object of the present invention lies in providing an improved plug-in connector arrangement which preferably enables blind plugging-in of a plug-in connector and a mating plug-in connector.

The present invention is also based on the object of providing an improved electrical plug-in connector which may preferably be suitable for blind plugging into a mating plug-in connector.

In terms of the plug-in connector arrangement the object is achieved by the features set forth in claim 1. In terms of the electrical plug-in connector the object is achieved by the features of claim 15.

The dependent claims and the features described hereunder relate to advantageous embodiments and variants of the invention.

Provided is a plug-in connector arrangement which has a first fastening element that is able to be assembled on an assembly (for example a frame assembly and/or insertion assembly as will yet be mentioned hereunder), and an electrical plug-in connector that is connected to the first fastening element.

A fastening element in the context of the invention can be configured for fastening, preferably fastening directly, the plug-in connector, or the plug-in connector housing thereof/ the mating plug-in connector or the mating plug-in connector housing thereof to the respective assembly.

A fastening element in the context of the invention is preferably not a fastening screw that is mounted or screw-fitted in a floating manner.

The first fastening element and/or the second fastening element yet to be mentioned hereunder can be configured as, for example, a frame, an angle, a cantilever, a suspension or a fastening arm.

The (first and/or second) fastening element can be configured so as to be integral to the respectively assigned assembly, or be configured in multiple parts with the latter.

The plug-in connector, or the mating plug-in connector, respectively, can be mechanically connected to the corresponding fastening element so as to assign the plug-in connector, or the mating plug-in connector, respectively, to the respective assembly, in particular for fastening said plug-in connector, or said mating plug-in connector, respectively, to said respective assembly. The plug-in connector, or the mating plug-in connector, respectively, by way of the respective fastening element can be indirectly connected to the assembly.

The first fastening element and/or the second fastening element yet to be mentioned hereunder can be connected to the respectively assigned assembly in a force-fitting, form-fitting and/or materially integral manner. For example, the fastening element can be screwed, riveted, adhesively bonded and/or welded to the corresponding assembly.

It is provided according to the invention that the plug-in connector is connected to the first fastening element in such a manner that the plug-in connector is displaceable along at least one translatory degree of freedom.

The position of the plug-in connector, in the state thereof connected to the first fastening element, can thus be variable along at least one translatory degree of freedom.

It can be provided that the plug-in connector is connected to the first fastening element in such a manner that the plug-in connector is immovably fixed along exactly one rotary degree of freedom, preferably along exactly two rotary degrees of freedom. For example, the plug-in connector can be connected to the first fastening element in such a manner that the plug-in connector, additionally to the at least one translatory degree of freedom, is also movable along exactly one rotary degree of freedom in such a manner that the plug-in connector can rotate about the central axis thereof. However, the plug-in connector can also be connected to the first fastening element in such a manner that the plug-in connector is fixedly established along all three rotary degrees of freedom.

The plug-in connector is preferably connected to the first fastening element in such a manner that the plug-in connector is not able to be tilted along the central axis of the latter.

According to the invention, the plug-in connector has a first guide means so as to conjointly with an electrical mating plug-in connector configure an approximate guide which, for plugging into one another, positions the plug-in connector and the mating plug-in connector relative to one another.

The approximate guide can in particular be configured so as to further converge the central axes of the plug-in connector and of the mating plug-in connector by displacing the plug-in connector and/or the mating plug-in connector while plug-fitting the plug-in connection, preferably until the central axes of the plug-in connector and of the mating plug-in connector run coaxially.

The approximate guide is preferably configured as a mechanical approximate guide. Additionally or alternatively however, the approximate guide can also be implemented by way of a magnetic interaction between the plug-in connector and the mating plug-in connector. In this way, a magnetic and/or mechanical approximate guide can thus be provided, for example.

Overall, the invention can aim at expanding the outer conductor or a plug-in connector housing of a plug-in connector by adding the function of compensating the position of remaining distances, in particular during blind plugging-in. Blindly plug-fitting the plug-in connection is possible according to the invention, because the plug-in connector in the state thereof connected to the first fastening element is displaceable by way of the approximate guide. As a result, tilting of the plug-in connector or of the mating plug-in connector while plugging the former into the latter is not mandatory.

In one advantageous refinement of the invention it can be provided that the plug-in connector is connected to the first fastening element in such a manner that the plug-in connector is displaceable along exactly one translatory degree of freedom or along exactly two translatory degrees of freedom.

For example, the first fastening element conjointly with the plug-in connector can configure a first linear guide so as to enable a movement of the plug-in connector along exactly one translatory degree of freedom.

The plug-in connector can be connected to the first fastening element in such a manner that the plug-in connector is fixedly established along at least one translatory degree of freedom (in particular along the translatory degree of freedom hereunder also referred to as the "third translatory degree of freedom").

The plug-in connector is particularly preferably connected to the first fastening element in such a manner that the plug-in connector, except the exactly one translatory degree of freedom or the exactly two translatory degrees of freedom, is not movable along any degree of freedom, in particular while disregarding any potential tolerances.

In principle however, the plug-in connector can also be connected to the first fastening element in such a manner that the plug-in connector along the third translatory degree of freedom still has minor play for compensating tolerances, said play however not being able to substantially contribute toward the relative positioning of the plug-in connector and of the mating plug-in connector by the approximate guide.

Optionally, it can be provided that the plug-in connector in or on the first fastening element is spring mounted along the third translatory degree of freedom so as to protect the contacts of the plug-in connector, or the mating contacts of the mating plug-in connector, respectively, in relation to excessive mechanical plug-in forces.

According to one refinement of the invention it can be provided that the plug-connector arrangement has a frame assembly, an insertion assembly which along a mechanical guide of the frame assembly is insertable into the frame assembly, and an electrical mating plug-in connector.

The insertion assembly can preferably be aligned on the frame assembly, or in the guide of the frame assembly, respectively.

As a result of the plug-in connector arrangement enabling the plug-in connector and the mating plug-in connector to be positioned in a compensating manner during the establishment of the plug-in connection, the tolerances of the guide for inserting the insertion assembly into the frame assembly can be conceived to be correspondingly large, this potentially being particularly comfortable for a user of the plug-in connector arrangement, in particular for easily introducing the insertion assembly into the guide of the frame assembly. Tolerances of the guide, or between the insertion assembly and the frame assembly, respectively, can be advantageously compensated for by the solution according to the invention.

The assembling of the insertion assembly can preferably take place solely in the vertical direction along a rectilinear movement along the mechanical guide of the frame assembly. Rotating or tilting the insertion assembly is particularly preferably not envisaged.

Moreover, the plug-connector arrangement preferably has a second fastening element that is connected to the mating plug-in connector. It is to be mentioned that features of the first fastening element can also be applied to the second fastening element even if this is not explicitly mentioned.

The first fastening element (and thus the plug-in connector) can be assembled on the frame assembly, and the second fastening element (and thus the mating plug-in connector) can be assembled on the insertion assembly, or vice versa.

Optionally, the mating plug-in connector can also be fastened directly, thus without a second fastening element, to the assembly, for example the mentioned frame assembly or the insertion assembly (for example in a housing cutout or in a bore of the assembly). However, indirect fastening of the mating-plug-in connector by means of the second fastening element is preferably envisaged.

The frame assembly can be, for example, a module housing, and the insertion assembly can be a modular rear wall of the module housing. The frame assembly can also be a door frame, for example, and the insertion assembly can be a door. Moreover, the frame assembly can be a cabinet element, and the insertion assembly can be a drawer or a shelf element for the cabinet element. Furthermore, the frame assembly can be a body component, and the insertion assembly can be a further body component of a vehicle.

The frame assembly and/or the insertion assembly can in particular also comprise electrical or electronic construction elements, electronic circuits and/or electrical or other technical units. For example, the frame assembly and/or the insertion assembly can comprise one or a plurality of apparatuses. The frame assembly and/or the insertion assembly can also be configured as a control cabinet or as part of a control cabinet. In principle, arbitrary frame assemblies and corresponding insertion assemblies can be provided for use with the invention.

While the invention will be described substantially by means of a frame assembly and an insertion assembly, arbitrary assemblies to which the first fastening element and the second fastening element (or the mating plug-in connector) can be fastened may be provided in principle.

The mating plug-in connector can preferably have a second guide means so as to conjointly with the plug-in connector configure the approximate guide.

According to one refinement of the invention it can be provided that the mating plug-in connector is connected to the second fastening element in such a manner that the mating plug-in connector is displaceable along at least one translatory degree of freedom, preferably along exactly one translatory degree of freedom, or along exactly two translatory degrees of freedom.

The position of the mating plug-in connector in the state thereof connected to the second fastening element can thus be variable along at least one translatory degree of freedom.

It can be provided that the mating plug-in connector is connected to the second fastening element in such a manner that the mating plug-in connector is immovably fixed along exactly one rotary degree of freedom, preferably along exactly two rotary degrees of freedom. For example, the mating plug-in connector can be connected to the second fastening element in such a manner that the mating plug-in connector, additionally to the at least one translatory degree of freedom, is also movable along exactly one rotary degree of freedom in such a manner that the mating plug-in connector can rotate about the central axis of the latter. However, the mating plug-in connector can also be connected to the second fastening element in such a manner that the mating plug-in connector is fixedly established along all three rotary degrees of freedom.

The mating plug-in connector is preferably connected to the second fastening element in such a manner that the mating plug-in connector is not able to be tilted along the central axis of the latter.

In principle however, it can also be provided that the mating plug-in connector is connected to the second fastening element, or directly to the assembly assigned to the mating plug-in connector, for example the frame assembly or the insertion assembly, in such a manner that the mating plug-in connector is fixed along all degrees of freedom (in particular while disregarding any potential tolerances). In the context of the invention it can thus already be sufficient for only the plug-in connector to be displaceable along at least one translatory degree of freedom.

In one refinement of the invention it can be provided that the plug-in connector is connected to the first fastening element in such a manner that the plug-in connector is displaceable orthogonally to the profile of the mechanical guide. Alternatively or additionally, it can be provided that the mating plug-in connector is connected to the second fastening element in such a manner that the mating plug-in connector is displaceable orthogonally to the profile of the mechanical guide.

The profile of the mechanical guide preferably extends in a linear manner along a third translatory degree of freedom.

The plug-in connector and/or the mating plug-in connector in the state thereof connected to the respective fastening element are/is preferably movable exclusively orthogonally to the third translatory degree of freedom.

The fastening elements are preferably aligned on the frame assembly, or on the insertion assembly, respectively, in such a manner that the central axis of the plug-in connector and the central axis of the mating plug-in connector run parallel to one another and to the profile of the mechanical guide, or to the third translatory degree of freedom, respectively.

It can be provided that the central axes of the plug-in connector and of the mating plug-in connector are situated in a mutually pre-aligned position when the insertion assembly is inserted into the frame assembly in such a manner that the approximate guide is able to position the plug-in connector and the mating plug-in connector relative to one another so as to be plugged in to one another proceeding from the pre-aligned position.

The approximate guide is preferably configured for displacing the plug-in connector and/or the mating plug-in connector orthogonally to the profile of the mechanical guide, so as to position the plug-in connector and the mating plug-in connector relative to one another.

The approximate guide can be configured for utilizing the freedom of movement provided for the plug-in connector, or the mating plug-in connector, respectively, in the respective fastening element for positioning the plug-in connector or the mating plug-in connector, respectively. In this way, the approximate guide is able to displace the plug-in connector and/or the mating plug-in connector on the respective fastening element or within the respective fastening element.

In one refinement of the invention it can be provided that the first fastening element has a clearance for the plug-in connector. Alternatively or additionally, it can be provided that the second fastening element has a clearance for the mating plug-in connector.

The first fastening element preferably has a clearance for the plug-in connector, and the second fastening element preferably has a clearance for the mating plug-in connector.

The clearance can be configured so as to be round, oval or rectangular, for example square. In principle, the clearance may have any arbitrary geometry.

The clearance can be, for example, a bore in the fastening element. However, the clearance can also be a slot in the fastening element into which the plug-in connector, or the mating plug-in connector, respectively, is able to be introduced when proceeding from a front, open end.

The fastening element can also be configured in multiple parts, for example two parts. In particular in this instance, a clearance for fastening the plug-in connector, or the mating plug-in connector, respectively, can be closed in a fully circumferential manner after the plug-in connector or the mating plug-in connector, respectively, has been assembled, so as to captively fasten the plug-in connector, or the mating plug-in connector, respectively, to the fastening element.

In one advantageous refinement of the invention it can be provided that the plug-in connector is connected to the first fastening element in such a manner that the plug-in connector is displaceable along a first translatory degree of freedom. The mating plug-in connector can be connected to the second fastening element in such a manner that the mating plug-in connector is displaceable along a second translatory degree of freedom.

In this way, the plug-in connector, in the state thereof connected to the first fastening element, can be displaceable orthogonally to the mating plug-in connector and to the profile of the mechanical guide, or orthogonally to the third translatory degree of freedom, respectively. In an analogous manner, the mating plug-in connector, in the state thereof connected to the second fastening element, can be displaceable orthogonally to the plug-in connector and orthogonally to the profile of the mechanical guide, or to the third translatory degree of freedom, respectively.

The plug-in connector is preferably displaceable exclusively along the first translatory degree of freedom and thus not along any further degree of freedom, and the mating plug-in connector is preferably displaceable exclusively along the second translatory degree of freedom and thus not along any further degree of freedom. As a result thereof it can be ensured that an envisaged radial orientation between the plug-in connector and the mating plug-in connector is already pre-fixed, or fixedly provided, respectively, and is no longer undesirably changed while the plug-in connection is being established. This can be particularly advantageous when the contacts within the plug-in connector and the mating contacts within the mating plug-in connector are not embodied so as to be coaxial, and a radial orientation is important while plug-fitting the plug-in connection.

In one refinement of the invention it can be provided that a plug-in connector housing of the plug-in connector has at least one guide groove and/or at least one guide rib for connecting the plug-in connector to the first fastening element. Alternatively or additionally, it can be provided that a mating plug-in connector housing of the mating plug-in connector has at least one guide groove or at least one guide rib for connecting the mating plug-in connector to the second fastening element.

For example, a slot-shaped guide groove having a rectangular cross section can be provided. Alternatively, a T-groove or a dovetail groove can also be provided.

A guide groove running in the shape of a spiral can also be provided, a peg of the mating plug-in connector in the context of a bayonet connection being guided in said guide groove when plug-fitting the plug-in connection, for example.

The combination of at least one guide groove of the plug-in connector, or mating plug-in connector, respectively, with a clearance in the respective fastening element can be particularly suitable for still enabling a mobility of the plug-in connector, or of the mating plug-in connector, respectively, in the state thereof connected to the respective fastening element, along at least one degree of freedom.

However, one or a plurality of guide ribs of the plug-in connector, or mating plug-in connector, respectively, can also advantageously interact with the respective fastening element so as to still enable a mobility of the plug-in connector, or of the mating plug-in connector, respectively, in the state thereof connected to the respective fastening element, along at least one degree of freedom.

In one advantageous refinement of the invention it can be provided that the plug-in connector housing has two linear guide grooves which lie opposite one another along the external circumference of the plug-in connector housing, or an annular groove which encircles the external circumference of the plug-in connector housing in an annular manner. Alternatively or additionally, it can be provided that the mating plug-in connector housing has two linear guide grooves which lie opposite one another along the external circumference of the mating plug-in connector housing, or an annular groove which encircles the external circumference of the mating plug-in connector housing in an annular manner.

In one advantageous refinement of the invention it can also be provided that the plug-in connector housing and/or the mating plug-in connector housing have/has at least two linear guide ribs which lie opposite one another along the external circumference. In particular, two linear guide ribs can in each case configure one guide rib par, wherein two guide rib pairs lie opposite one another along the external circumference. Moreover, at least one annular guide rib which encircles the external circumference in an annular manner, for example also two axially offset guide ribs which encircle said external circumference in the manual manner, can also be provided.

Two mutually opposite linear guide grooves or guide ribs may be comparatively well suitable for fixedly plug-fitting the plug-in connector, or the mating plug-in connector, respectively, so as to be secured against rotating and tilting in the respective fastening element (i.e. so as to be immovable along all three rotary degrees of freedom), wherein a mobility along exactly one translatory degree of freedom is simultaneously maintained.

In contrast, a design embodiment having an encircling annular groove along the respective housing, or at least one guide rib encircling in an annular manner, can be advantageously suitable when the mobility is to be maintained at least along one rotary degree of freedom in order for the plug-in connector, or the mating plug-in connector, respectively, to be rotated about the central axis thereof. The clearance of the respective fastening element can have an internal radius which is larger than the internal radius of the annular groove but is smaller than the radius of the plug-in connector housing, or of the mating plug-in connector housing, respectively. As a result, mechanical play, and thus a mobility of the plug-in connector, or of the mating plug-in connector, respectively, can be provided along exactly two translatory degrees of freedom within the respective fastening element.

In one advantageous refinement of the invention it can be provided that the plug-in connector is connected to the first fastening element in such a manner that the central axis of the plug-in connector is aligned parallel to the profile of the mechanical guide. Alternatively or additionally, it can be provided that the mating plug-in connector is connected to the second fastening element in such a manner that the central axis of the mating plug-in connector is aligned parallel to the profile of the mechanical guide.

In particular, a parallel alignment of the central axes of the plug-in connector and of the mating plug-in connector and of the profile of the mechanical guide of the frame assembly has proven to be particularly suitable.

In one particularly preferred embodiment, the plug-in connector housing, or the mating plug-in connector housing, respectively, by way of integrated guide grooves or by way of the guide ribs mentioned are able to slide along a respective fastening element which is configured as a metallic angle, wherein the respective fastening element simultaneously serves for guiding and for fastening the plug-in connector or the mating plug-in connector, respectively. Distances by way of which the central axes of the plug-in connector and of the mating plug-in connecter are offset can be compensated for along two degrees of freedom by way of the approximate guide, in particular by way of conical contours on the plug-in connector housing and on the mating plug-in connector housing, and optionally the precision guide yet to be mentioned hereunder, so that the plug-in connection can be blindly established.

In one advantageous refinement of the invention it can be provided that the first guide means is configured as a gate funnel for receiving an introduction portion, and the second guide means is configured as an introduction portion for introducing into the gate funnel, or vice versa.

A combination of a gate funnel and an introduction portion can in particular be especially suitable for configuring an approximate guide.

The plug-in connector and the mating plug-in connector preferably have a respective corresponding interface for mutual connection. The introduction portion can be disposed on the front end of the interface of the plug-in connector or of the mating plug-in connector. The gate funnel can be disposed on the front end of the interface of the plug-in connector or of the mating plug-in connector.

In one design embodiment of the invention it can be provided that the gate funnel tapers proceeding from a front end configured for receiving the introduction portion.

In one design embodiment of the invention it can moreover be provided that the introduction portion tapers in the direction toward a front end to be introduced into the gate funnel.

Conical tapering of the gate funnel and/or of the introduction portion can in particular be provided. However, spherical tapering may also be provided.

According to one refinement of the invention it can in particular be provided that the gate funnel, proceeding from a front end which is configured for receiving the introduction portion, tapers by way of at least two different gradients. Alternatively or additionally, it can be provided that the introduction portion in the direction toward a front end, which is to be introduced into the gate funnel, tapers by way of at least two different gradients.

The conical contour of the gate funnel and/or of the introduction portion can thus also be configured in multiple stages so as to in stages enhance the precision of the approximate guide while plug-fitting the plug-in connection.

According to one refinement of the invention it can be provided that the plug-in connector and the mating plug-in connector configure a precision guide so as to align a radial orientation of the plug-in connector relative to a radial orientation of the mating plug-in connector for plugging in to one another contact elements of the plug-in connector and corresponding mating contact elements of the mating plug-in connector.

A precision guide can be advantageous in particular when the rotational alignment between the plug-in connector and the mating plug-in connector is important, in particular when the plug-in connector/mating plug-in connector are not configured so as to be coaxial, or when the plug-in connection is able to be established only in specific orientations, respectively.

The precision guide can thus be able to be used for a radial alignment of the plug-in connection.

It can be provided that the precision guide has a mechanical coding. Moreover, it can be provided that the precision guide has a guide slot control.

For example, the mechanical coding can be configured as a pairing of a rib and groove on the external faces and/or internal faces of the plug-in connector and of the mating plug-in connector. A mechanical coding so as to enable the plug-in connector to be plugged into the mating plug-in connector only in specific radial orientations, can in particular be implemented by dissimilar widths of the ribs and the grooves configured therebetween.

The guide slot control can in particular be designed as a bayonet connection.

In one advantageous refinement of the invention it can be provided that the plug-in connector arrangement has a magnetic arrangement which is configured for configuring or facilitating the approximate guide and/or the precision guide.

The magnetic arrangement can have one, two, three, four or even more permanent magnets. However, the magnetic arrangement can also have magnetic elements, for example iron, which magnetically react under the influence of a permanent magnet. The permanent magnets of the magnetic arrangement can be disposed in the plug-in connector and/or in the mating plug-in connector. For example, an annular magnet can be provided in the plug-in connector and/or an annular magnet can be provided in the mating plug-in connector.

The permanent magnets in the plug-in connector and/or in the mating plug-in connector can be oriented in such a manner that said permanent magnets are able to align the plug-in connector and/or the mating plug-in connector radially and/or laterally. The magnetic arrangement can advantageously support the technician when radially and/or horizontally aligning the plug-in connection.

Optionally, the plug-in connector in a completely plugged-in-state can latch to the mating plug-in connector. To this end, a snap-fit connection can be provided, for example. However, a latching mechanism is not mandatory. Depending on the specific application, it can also be provided, for example, that the plug-in connection remains closed solely by the weight of one of the assemblies, for example when the insertion assembly is inserted from above, or vertically into the frame assembly, respectively.

In principle, the plug-in connector arrangement can also have even further fastening elements and even further plug-in connectors or mating plug-in connectors, respectively, which are disposed beside one another on the respective assembly, in particular on the frame assembly and the insertion assembly, for example.

The plug-in connector according to the invention, or the plug-in connector arrangement according to the invention, respectively, is particularly advantageously suitable for connecting a drive module, the latter being part of the insertion assembly, to a frame assembly of a conveyor belt. In this way, the drive module can be blindly assembled below the conveyor belt. The invention is particularly advantageously suitable for use in mail sorting centers or logistic centers, for example for sorting parcels, goods and/or baggage.

The invention also relates to an electrical plug-in connector for a plug-in connector arrangement according to the embodiments above and hereunder.

Moreover, the invention relates to an electrical mating plug-in connector for a plug-in connector arrangement according to the embodiments above and hereunder.

According to the invention, a slidingly mounted, position-compensating plug-in connector, or mating plug-in connector, can advantageously be provided.

The plug-in connector can have one contact element or a plurality of contact elements. Accordingly, the mating plug-in connector can have one mating contact element or a plurality of mating contact elements.

The plug-in connector, or the mating plug-in connector, respectively, can be configured so as to be coaxial. However, non-coaxial design embodiments of the plug-in connection can also be provided.

The electrical plug-in connection composed of the plug-in connector and the mating plug-in connector is not limited to a specific type of plug-in connector, the invention being in particular suitable for plug-in connectors or plug-in connections for the high-frequency technology sector. Said plug-in connectors, or plug-in connections here can in particular be plug-in connectors or plug-in connections, respectively of the type PL, BNC, TNC, SMBA (FAKRA), SMA, SMB, SMS, SMC, SMP, BMS, HFM (FAKRA-Mini), H-MTD, BMK, Mini-Coax or MATE-AX.

However, the plug-in connector according to the invention, or the plug-in connector arrangement according to the invention, respectively, is suitable for arbitrary applications within the entire field of electrical engineering. The plug-in connector according to the invention can also be advantageously used within a vehicle, in particular a motor vehicle, for example.

Features which have been described in the context of the plug-in connector arrangement can of course also be advantageously applied to the electrical plug-in connector or the electrical mating plug-in connector, and vice versa. Furthermore, advantages which have already been mentioned in the context of the plug-in connector arrangement can also be understood to relate to the electrical plug-in connector or the electrical mating plug-in connector, and vice versa.

It is to be additionally pointed out that terms such as “comprising”, “having” or “with” do not preclude any other features or steps. Furthermore, terms such as “a/one” or “the”, which suggest a singularity of steps or features, do not preclude a plurality of steps or features, and vice versa.

In a puristic embodiment of the invention, it may however also be provided that the features introduced in the invention by the terms “comprising”, “having” or “with” constitute an exhaustive list. Accordingly, in the context of the invention, one or more enumerations of features can be considered in self-contained form, for example considered respectively for each claim. For example, the invention can be composed exclusively of the features mentioned in claim 1.

It is furthermore emphasized that the values and parameters described in the present case also encompass deviations or fluctuations of ±10% or less, preferably ±5% or less, more preferably ±1% or less, and very particularly preferably ±0.1% or less, of the respectively stated value or parameter, if such deviations are not ruled out in practice in the implementation of the invention. The specification of ranges by way of start and end values also encompasses all values and fractions encompassed by the respectively stated range, in particular the start and end values and a respective mean value.

Exemplary embodiments of the invention will be described in more detail hereunder by means of the drawing.

The figures show in each case preferred exemplary embodiments in which individual features of the present invention are illustrated in combination with one another. Features of one exemplary embodiment can also be implemented independently of the other features of the same exemplary embodiment and can accordingly be readily combined with features of other exemplary embodiments by a person skilled in the art so as to form further expedient combinations and sub-combinations.

In the figures, functionally identical elements are provided with the same reference signs.

In a schematic manner:

FIG. 1 shows a plug-in connector arrangement 1 according to the invention in a perspective illustration.

FIG. 2 shows the plug-in connector arrangement 1 in a sectional illustration, in a closed state of the plug-in connection.

Figure 1:
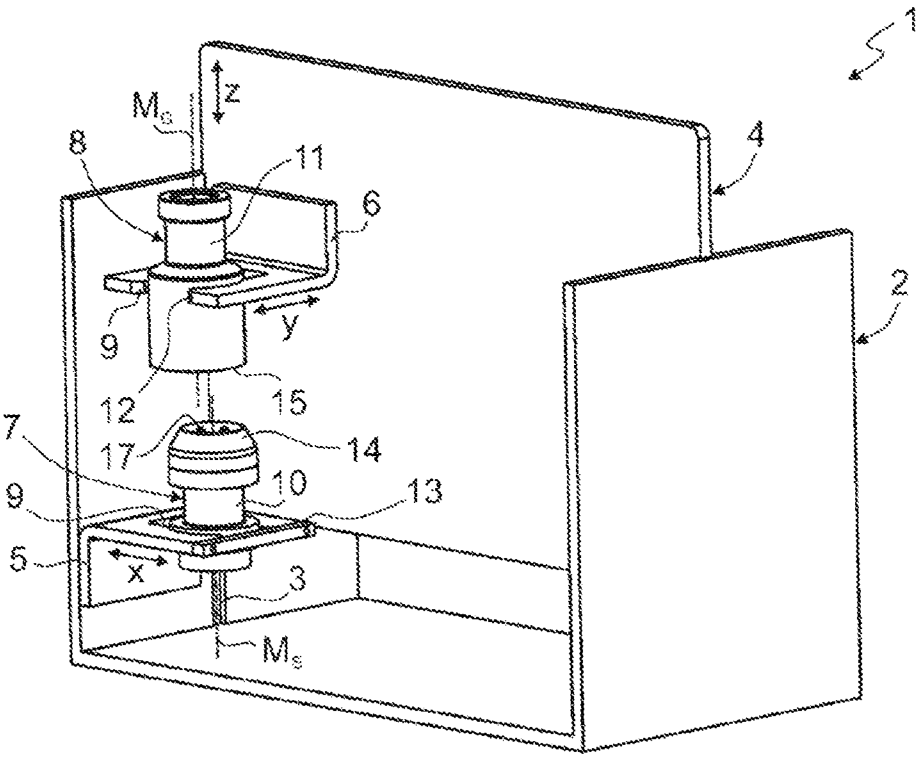
FIG. 1 shows a plug-in connector arrangement according to the invention in a perspective illustration, having a frame assembly, an insertion assembly that is insertable into the frame assembly, a first fastening element, a second fastening element, an electrical plug-in connector connected to the first fastening element, and an electrical mating plug-in connector connected to the frame assembly.
Figure 2:
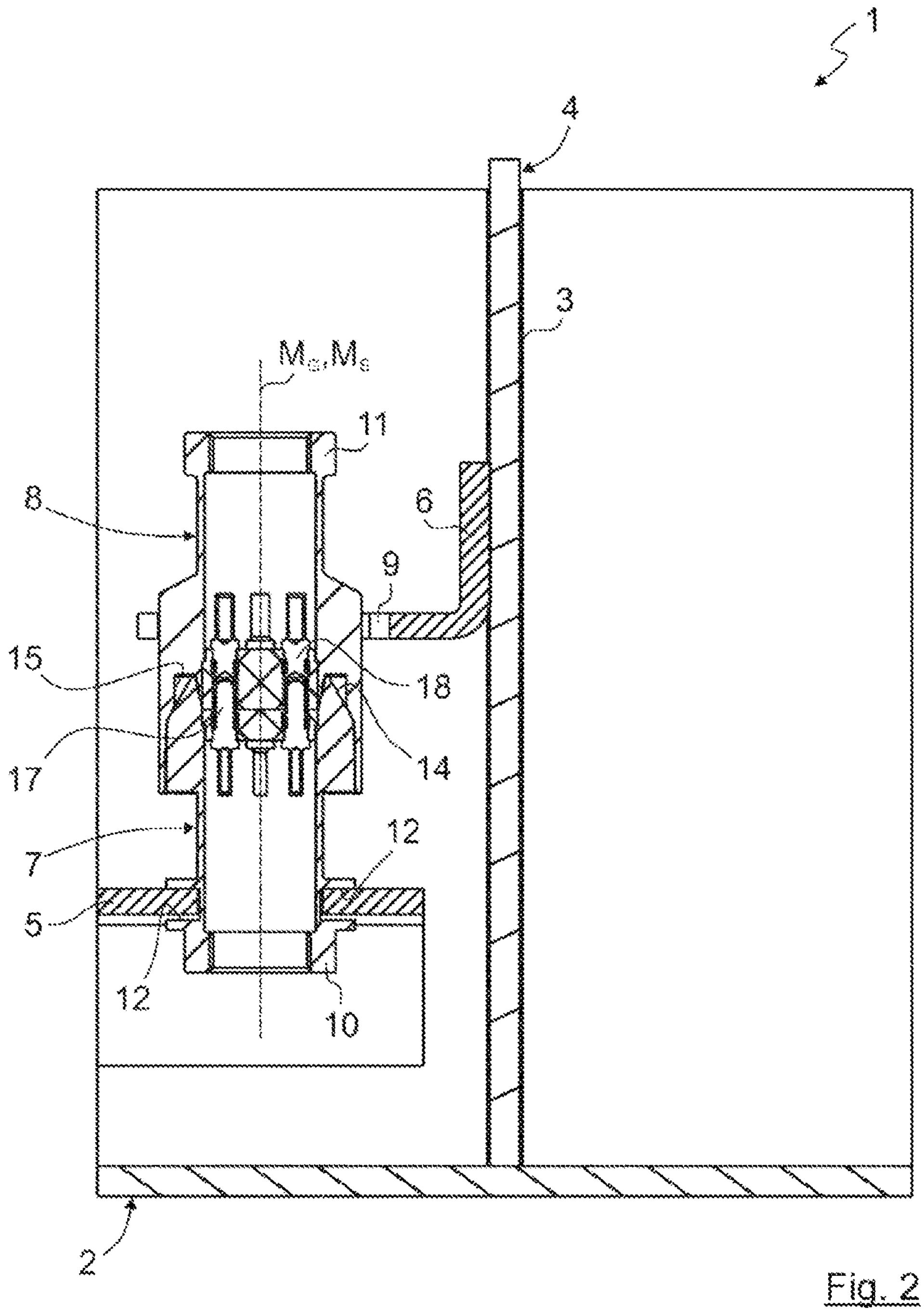
FIG. 2 shows the plug-in connector arrangement of FIG. 1 in a sectional illustration in a closed state of the plug-in connection.

The plug-in connector arrangement 1 has a frame assembly 2 and an insertion assembly 4 which is insertable along a mechanical guide 3 of the frame assembly 2. The insertion assembly 4 can be, for example, a drive module for a conveying installation.

The plug-in connector arrangement 1 moreover has a first fastening element 5, assembled on the frame assembly 2, and a second fastening element 6, assembled on the insertion assembly 4. The fastening elements 5, 6 in an exemplary manner are configured as metallic angles but can in principle be of any configuration. The fastening elements 5, 6 can also be configured so as to be integral to the frame assembly 2 or the insertion assembly 4.

Figure 3:
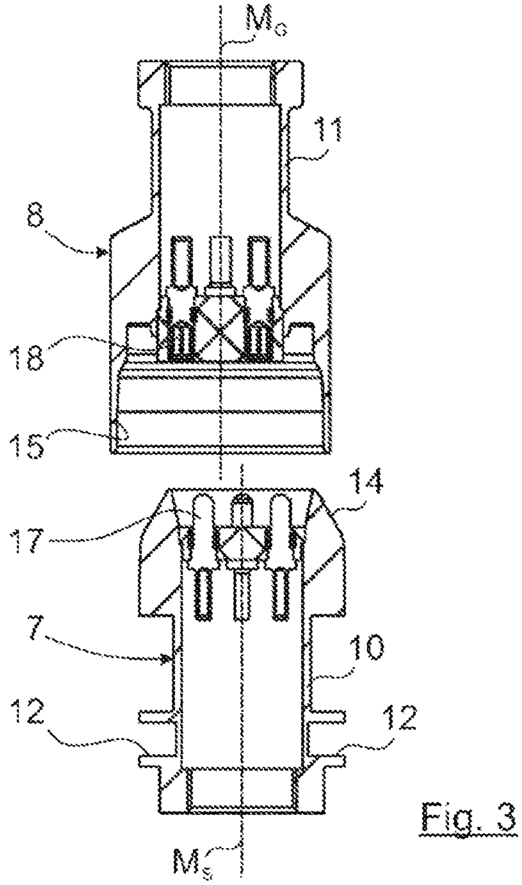
FIG. 3 shows an individual illustration of the plug-in connector and of the mating plug-in connector of the plug-in connector arrangement of FIG. 1 in a sectional illustration, in a prepositioned state of the plug-in connection.
Figure 4:
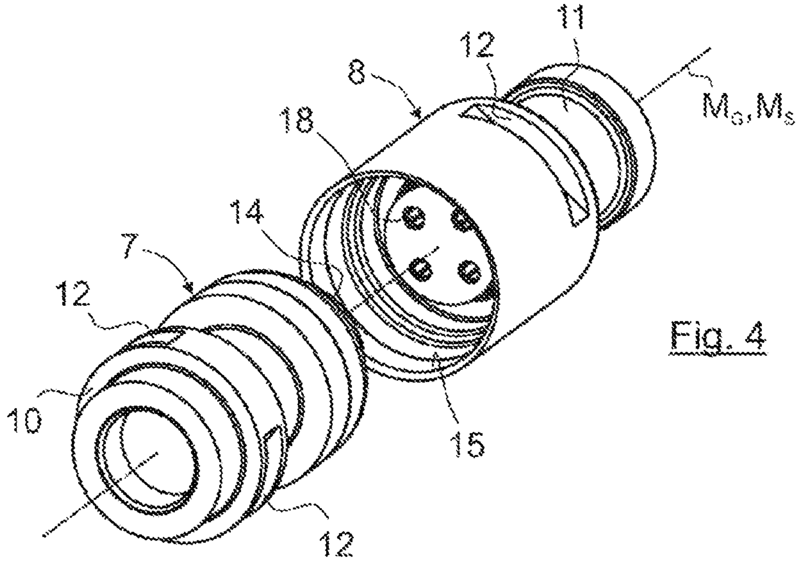
FIG. 4 shows a perspective individual illustration of the plug-in connector and of the mating plug-in connector of the plug-in connector arrangement of FIG. 1.

The plug-in connector arrangement 1 has an electrical plug-in connector 7 and a corresponding electrical mating plug-in connector 8. FIG. 3 shows an individual illustration of the plug-in connector 7 and of the mating plug-in connector 8 of the plug-in connector arrangement 1 of FIG. 1 in a sectional illustration, in a pre-positioned state of the plug-in connection. FIG. 4 shows a perspective individual illustration.

The plug-in connector 7 is connected to the first fastening element 5, and the mating plug-in connector 8 is connected to the second fastening element 6. The connection of the plug-in connector 7, or of the mating plug-in connector 8, respectively, and the respective fastening element 5, 6 can in particular be designed in such a manner that the plug-in connector 7, or the mating plug-in connector 8, respectively, can be displaced along at least one translatory degree of freedom x, y, z. In the exemplary embodiment illustrated in FIGS. 1 to 4 it is provided that the plug-in connector 7 is connected to the first fastening element 5 in such a manner that the plug-in connector 7 is displaceable along exactly one first translatory degree of freedom x (cf. FIG. 1), wherein the mating plug-in connector 8 is connected to the second fastening element 6 in such a manner that the mating plug-in connector 8 is displaceable along exactly one second translatory degree of freedom y. Moreover, the plug-in connector 7 and the mating plug-in connector 8 are displaceable orthogonally to the profile of the mechanical guide 3, or to a third translatory degree of freedom z, respectively. Moreover, the plug-in connector 7 and the mating plug-in connector 8 are fixed so as to be secured against tilting and moreover also rotating in the respective fastening element.

The plug-in connector 7 in the exemplary embodiments by way of example is configured as a plug, and the mating plug-in connector 8 is configured as a socket. In principle however, the plug-in connector 7 and the mating plug-in connector 8 can be of any arbitrary configuration.

The plug-in connector 7 and/or the mating plug-in connector 8 can in each case be connected to an electrical cable (not illustrated). However, the plug-in connector 7 and/or the mating plug-in connector 8 can also be connected directly to an electric circuit, for example an electric circuit on a circuit board (not illustrated).

The fastening elements 5, 6 have in each case a clearance 9 for the plug-in connector 7, or for the mating plug-in connector 8, said clearance 9 in the exemplary embodiment of FIGS. 1 to 4 being configured in the shape of a slot and so as to be rectangular. For connecting the plug-in connector 7, or the mating plug-in connector 8, respectively, to the respective fastening element 5, 6, the plug-in connector housing 10 as well as the mating plug-in connector housing 11 have corresponding guide grooves 12. As can be particularly readily seen by means of FIG. 4, the plug-in connector housing 10 and the mating plug-in connector housing 11 have in each case two linear guide grooves 12 which lie opposite one another along the external circumference. As a result, the plug-in connector 7 and the mating plug-in connector 8 can be fixed so as to be secured against rotation and also tilting in the respective fastening element 5, 6, however still be movable in the manner of a linear guide along exactly one translatory degree of freedom x, y.

In order for the plug-in connector 7 and the mating plug-in connector 8 to be in each case captively received in the clearance 9 of the respective fastening element 5, 6, it can be provided that the front, open end of the clearance 9 is configured so as to be tighter, as a result of which the plug-in connector 7, or the mating plug-in connector 8, respectively, is able to latch in the clearance 9. However, a cover element 13 which is screwed to the fastening element 5, 6, for example, as is shown in an exemplary manner in the first fastening element 5 in FIG. 1, can also be provided. In principle, a captive feature can also be entirely dispensed with.

Finally, the plug-in connector 7 is connected to the first fastening element 5 in such a manner that the central axis $M_S$ of the plug-in connector 7 is aligned parallel to the profile of the mechanical guide 3. Furthermore, the mating plug-in connector 8 is connected to the second fastening element 6 in such a manner that also the central axis $M_G$ of the mating plug-in connector 8 is aligned parallel to the profile of the mechanical guide 3.

The plug-in connector 7 has a first guide means 14 so as to together with the mating plug-in connector 8 configure an approximate guide so as to position the plug-in connector 7 and the mating plug-in connector 8 relative to one another in order to be plugged into one another. In order for the approximate guide to be configured, the mating plug-in connector 8 in the exemplary embodiments has a corresponding second guide means 15. The approximate guide is configured for displacing the plug-in connector 7 and the mating plug-in connector 8 orthogonally to the profile of the mechanical guide 3 so as to finally position the plug-in connector 7 and the mating plug-in connector 8 relative to one another.

By way of example, the first guide means 14 of the plug-in connector 7 is configured as an introduction portion for introducing into a gate funnel, and the second guide means 15 of the mating plug-in connector 8 is configured as a gate funnel for receiving the introduction portion 14. The gate funnel 15 here, proceeding from a front end configured for receiving the introduction portion 14, tapers. Moreover, the introduction portion 14 tapers in the direction toward a front end to be introduced into the gate funnel 15. A conical taper is in each case provided in the exemplary embodiments of FIGS. 1 to 7 as well as 9 and 10. FIG. 8 by way of example shows a spherical variant.

Figure 5:
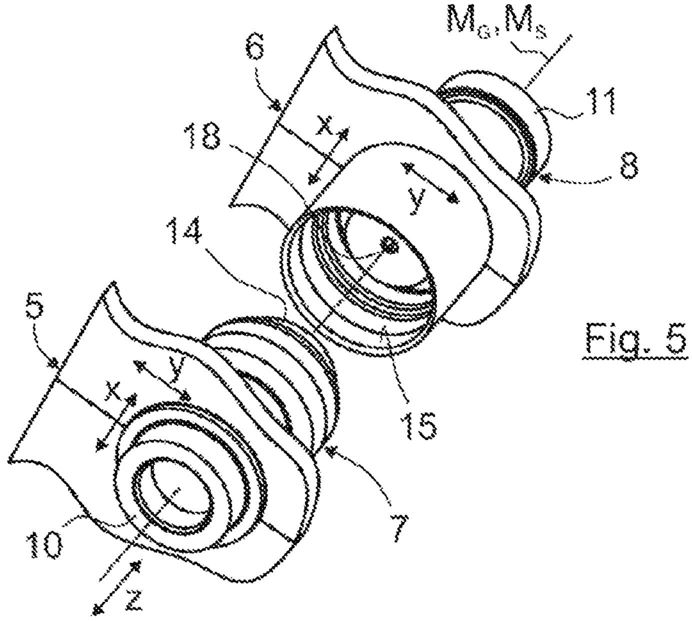
FIG. 5 shows a perspective illustration of a coaxial plug-in connector connected to a first fastening element, and of a coaxial mating plug-in connector connected to a second fastening element.
Figure 6:
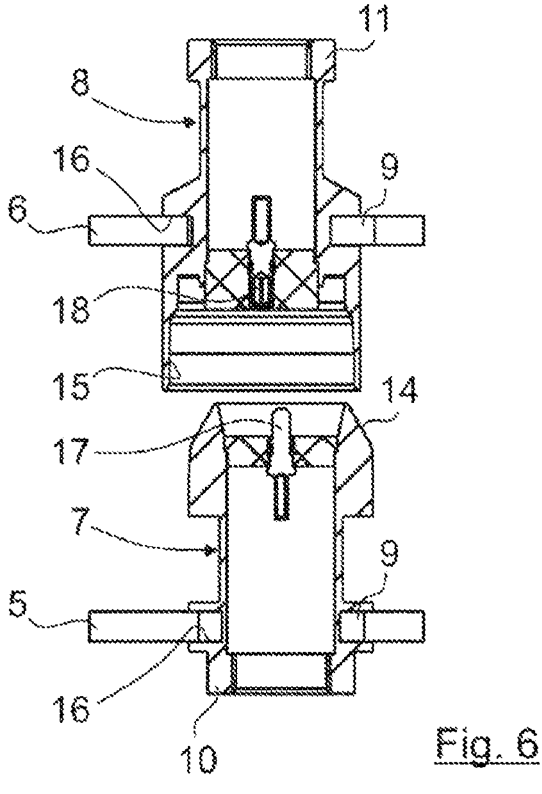
FIG. 6 shows a sectional illustration of the plug-in connector and of the mating plug-in connector of FIG. 5, having the respective fastening elements in a prepositioned state of the plug-in connection.
Figure 7:
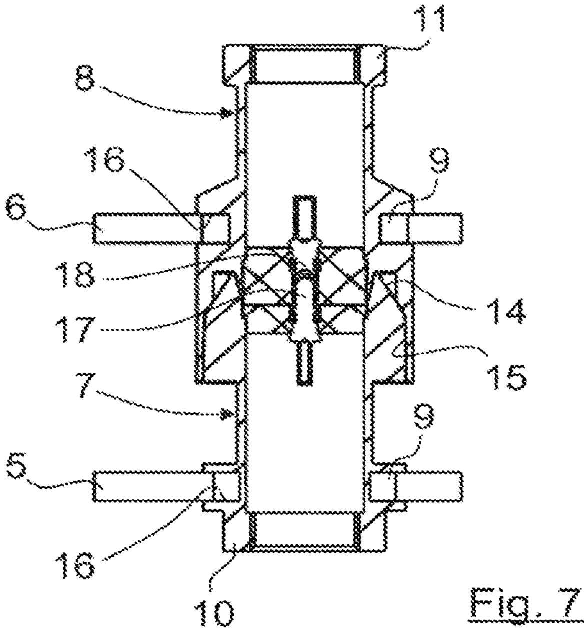
FIG. 7 shows a sectional illustration of the plug-in connector and of the mating plug-in connector of FIG. 5, having the respective fastening elements in a closed state of the plug-in connection.
Figure 8:
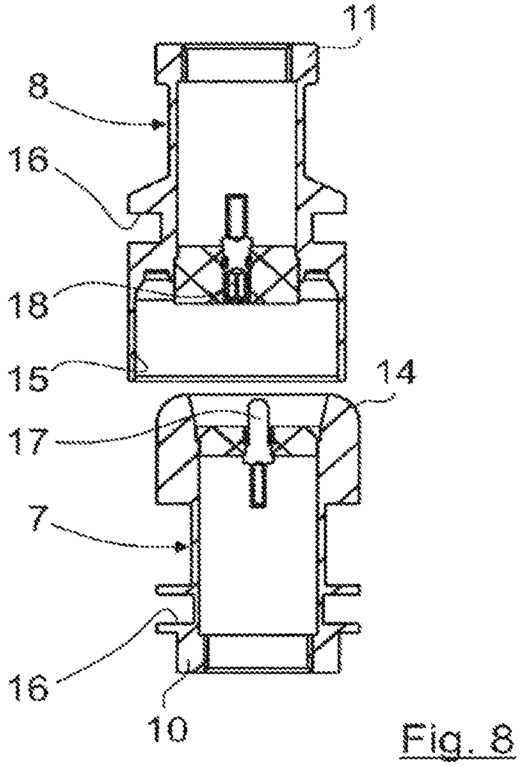
FIG. 8 shows a sectional illustration of a further coaxial plug-in connector and of a further coaxial mating plug-in connector, each having spherically configured guide means, in a prepositioned state of the plug-in connection.

FIGS. 5 to 7 show a second exemplary embodiment of a plug-in connector arrangement 1 according to the invention. FIG. 5 shows a perspective illustration, FIG. 6 shows a sectional illustration having the respective fastening elements 5, 6 in a pre-positioned state, and FIG. 7 shows a sectional illustration in a closed state of the plug-in connection.

While the plug-in connector 7 and the mating plug-in connector 8 according to the first exemplary embodiment of FIGS. 1 to 4 are of a multi-core configuration, FIGS. 5 to 7 show a coaxial variant. In terms of the coaxial variant, a radial orientation of the plug-in connector 7 relative to the mating plug-in connector 8 in principle is not relevant while plugging the latter two into one another. Accordingly, a rotation of the plug-in connector 7 or of the mating plug-in connector 8 about the central axis $M_S$, $M_G$ is in principle unproblematic and does not have to be mandatorily blocked, as in the exemplary embodiment of FIGS. 1 to 4.

The fastening elements 5, 6 of the exemplary embodiment for the plug-in connector 7, or the mating plug-in connector 8, respectively, of FIGS. 5 to 7 have in each case a round clearance 9 and are configured in two parts. The plug-in connector housing 10 and the mating plug-in connector housing 11 have an annular groove 16 which encircles the external circumference in an annular manner. There is between the annular groove 16 and the respective fastening element 5, 6 sufficient mechanical play provided in such a manner that at least the plug-in connector 7 can be displaced along the first translatory degree of freedom x and along the second translatory degree of freedom y, orthogonally to the profile of the mechanical guide 3. It can be provided that the mating plug-in connector 8 can also be displaced along the first translatory degree of freedom x and along the second translatory degree of freedom y; this is however not mandatory. It can already be sufficient for the plug-in connector 7 or the mating plug-in connector 8 exclusively to be able to be displaced.

Should a radial orientation of the plug-in connector 7 and of the mating plug-in connector 8 relative to one another be important while plugging the latter two into one another, for example so as to connect a plurality of contact elements 17 of the plug-in connector 7 to a plurality of corresponding mating contact elements 18 of the mating plug-in connector 8, a precision guide may be provided.

Figure 9:
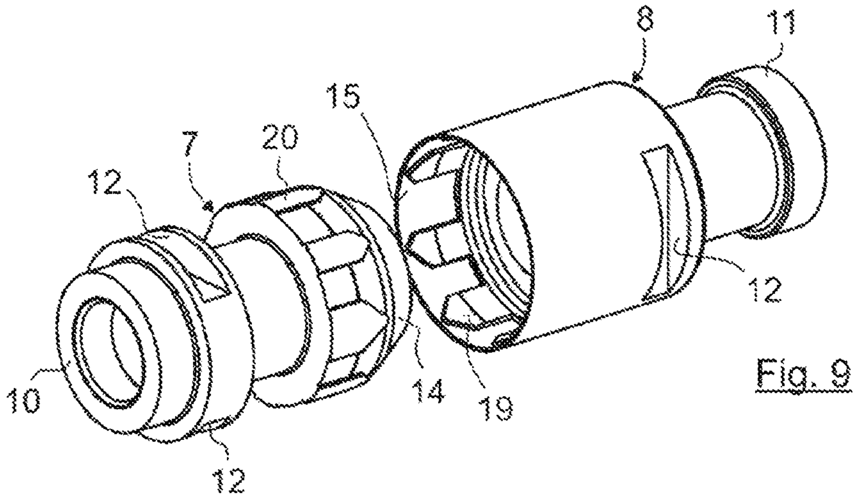
FIG. 9 shows a perspective individual illustration of a further plug-in connector and of a further mating plug-in connector, having a precision guide with a mechanical coding.

The precision guide can have a mechanical coding, as illustrated in FIG. 9. The mechanical coding can be formed, for example, by a combination of first ribs 19, configured on the internal wall of the mating plug-in connector 8, and corresponding second ribs 20, configured on the external wall of the plug-in connector housing 10, said second ribs tapering in the direction of the front end thereof. In order to form a mechanical coding, the ribs 19, 20 can have dissimilar widths along the circumference of the plug-in connector housing 10 and of the mating plug-in connector housing 11.

However, the ribs 19, 20 may also have identical widths and spacings and in this way, by way of the respective tips of said ribs 19, 20, facilitate the approximate guide (or configure the approximate guide). The ribs 19, 20 thus do not mandatorily have to serve for mechanical coding.

The approximate guide and/or the precision guide can moreover have a magnetic arrangement. The magnetic arrangement can comprise one or a plurality of permanent magnets 21 (cf. FIG. 10), for example also a permanent magnetic ring in the plug-in connector 7 and/or in the mating plug-in connector 8. As a result, centering and/or radial orienting of the plug-in connector 7 and of the mating plug-in connector 8 can take place in an advantageous manner.

Figure 10:
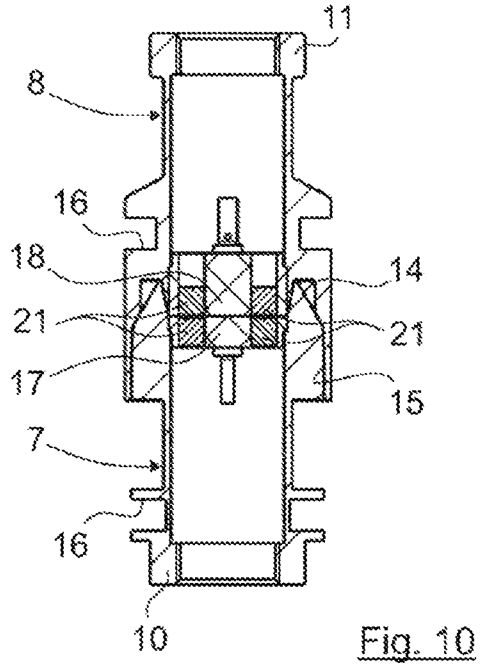
FIG. 10 shows a sectional illustration of a further plug-in connector and of a further mating plug-in connector, having a precision guide with a magnetic arrangement.

In combination with a magnetic arrangement, flat contacts can in particular be suitable for configuring the contact elements 17, or the mating contact elements 18, as is illustrated in FIG. 10. In contrast, the contact elements 17 and the mating contact elements 18 in the exemplary embodiments of FIGS. 1 to 9 are configured as plug-in contacts and corresponding socket contacts. In principle, the invention may be suitable for use with any arbitrary type of contact.

Figure 11:
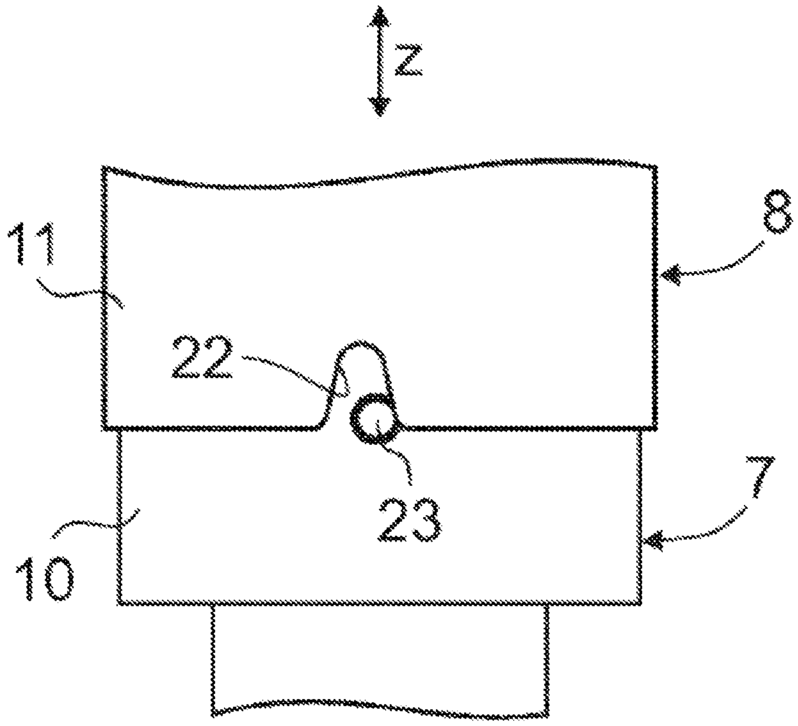
FIG. 11 shows a sectional illustration of a further plug-in connector and of a further mating plug-in connector, having a further, mechanically configured, precision guide.

The precision guide can moreover have a guide slot control, for example in the manner of a bayonet connection. Moreover, the mating plug-in connector housing 11 can have an external groove 22 in which a guide peg 23 of the plug-in connector 7 can be introduced in order for the plug-in connector 7 and/or the mating plug-in connector 8 to be aligned with great precision. This is indicated in FIG. 11.

What is claimed is:

1. A plug-in connector arrangement comprising a first fastening element that is able to be assembled on a first assembly, an electrical plug-in connector that is connected to the first fastening and a second fastening element that is able to be assembled on a second assembly and is connected to an electrical mating plug-in connector, wherein the plug-in connector is connected to the first fastening element in such a manner that the plug-in connector is displaceable along at least one translatory degree of freedom, wherein the plug-in connector has a first guide means so as to conjointly with an electrical mating plug-in connector configure an approximate guide which, for plugging into one another, positions the plug-in connector and the mating plug-in connector relative to one another, wherein the mating plug-in connector is connected to the second fastening element in such a manner that the mating plug-in connector is displaceable along at least one translatory degree of freedom, and wherein the plug-in connector is connected to the first fastening element in such a manner that the plug-in connector is displaceable along a first translatory degree of freedom, and wherein the mating plug-in connector is connected to the second fastening element in such a manner that the mating plug-in connector is displaceable along a second translatory degree of freedom, wherein the plug-in connector is connected to the first fastening element in such a manner that the plug-in connector is displaceable along exactly one translatory degree of freedom or along exactly two translatory degrees of freedom.

2. The plug-in connector arrangement as claimed in claim 1, wherein a) a plug-in connector housing of the plug-in connector has at least one guide groove and/or at least one guide rib for connecting the plug-in connector to the first fastening element; and/or b) a mating plug-in connector housing of the mating plug-in connector has at least one guide groove and/or at least one guide rib for connecting the mating plug-in connector to the second fastening element.

3. The plug-in connector arrangement as claimed in claim 2, wherein the plug-in connector housing and/or of the mating plug-in connector housing have a) two linear guide grooves which lie opposite one another along the external circumference; or b) at least two linear a guide ribs which lie opposite one another along the external circumference; or c) an annular groove which encircles the external circumference in an annular manner; or d) at least one annular guide rib which encircles the external circumference in an annular manner.

4. The plug-in connector arrangement as claimed in claim 1, wherein the plug-in connector and the mating plug-in connector configure a precision guide so as to align a radial orientation of the plug-in connector relative to a radial orientation of the mating plug-in connector for plugging into one another contact elements of the plug-in connector and corresponding mating contact elements of the mating plug-in connector.

5. The plug-in connector arrangement as claimed in claim 1, wherein a magnetic arrangement is provided for configuring or facilitating the approximate guide and/or the precision guide.

6. A plug-in connector arrangement comprising a first fastening element that is able to be assembled on a first assembly, an electrical plug-in connector that is connected to the first fastening and a second fastening element that is able to be assembled on a second assembly and is connected to an electrical mating plug-in connector, wherein the plug-in connector is connected to the first fastening element in such a manner that the plug-in connector is displaceable along at least one translatory degree of freedom, wherein the plug-in connector has a first guide means so as to conjointly with an electrical mating plug-in connector configure an approximate guide which, for plugging into one another, positions the plug-in connector and the mating plug-in connector relative to one another, wherein the mating plug-in connector is connected to the second fastening element in such a manner that the mating plug-in connector is displaceable along at least one translatory degree of freedom, and wherein the plug-in connector is connected to the first fastening element in such a manner that the plug-in connector is displaceable along a first translatory degree of freedom, and wherein the mating plug-in connector is connected to the second fastening element in such a manner that the mating plug-in connector is displaceable along a second translatory degree of freedom, wherein the plug-in connector arrangement has a frame assembly and an insertion assembly which along a mechanical guide is insertable into the frame assembly, wherein a) the first fastening element is assembled on the frame assembly, and the second fastening element is assembled on the insertion assembly; or b) the second fastening element is assembled on the frame assembly, and the first fastening element is assembled on the insertion assembly;

and wherein the mating plug-in connector has a second guide means so as to conjointly with the plug-in connector configure the approximate guide.

7. The plug-in connector arrangement as claimed in claim 6, wherein the mating plug-in connector is connected to the second fastening element in such a manner that the mating plug-in connector is displaceable along exactly one translatory degree of freedom or along exactly two translatory degrees of freedom.

8. The plug-in connector arrangement as claimed in claim 6, wherein a) the plug-in connector is connected to the first fastening element in such a manner that the plug-in connector is displaceable orthogonally to the profile of the mechanical guide; and/or b) the mating plug-in connector is connected to the second fastening element in such a manner that the mating plug-in connector is displaceable orthogonally to the profile of the mechanical guide;

wherein the approximate guide is configured for displacing the plug-in connector and/or the mating plug-in connector orthogonally to the profile of the mechanical guide so as to position the plug-in connector and the mating plug-in connector relative to one another.

9. The plug-in connector arrangement as claimed in claim 6, wherein the plug-in connector is connected to the first fastening element in such a manner that the central axis of the plug-in connector is aligned so as to be parallel to the profile of the mechanical guide, and/or the mating plug-in connector is connected to the second fastening element in such a manner that the central axis of the mating plug-in connector is aligned so as to be parallel to the profile of the mechanical guide.

10. The plug-in connector arrangement as claimed in claim 6, wherein the first guide means is configured as a gate funnel for receiving an introduction portion, and the second guide means is configured as an introduction portion for introducing into the gate funnel, and/or the second guide means is configured as a gate funnel for receiving the introduction portion, and the first guide means is configured as an introduction portion for introducing into the gate funnel.

11. The plug-in connector arrangement as claimed in claim 10, wherein the gate funnel, proceeding from a front end which is configured for receiving the introduction portion, tapers by way of at least two different gradients, and/or the introduction portion, in the direction toward a front end which is to be introduced into the gate funnel, tapers by way of at least two different gradients.

12. A plug-in connector arrangement comprising a first fastening element that is able to be assembled on a first assembly, an electrical plug-in connector that is connected to the first fastening and a second fastening element that is able to be assembled on a second assembly and is connected to an electrical mating plug-in connector, wherein the plug-in connector is connected to the first fastening element in such a manner that the plug-in connector is displaceable along at least one translatory degree of freedom, wherein the plug-in connector has a first guide means so as to conjointly with an electrical mating plug-in connector configure an approximate guide which, for plugging into one another, positions the plug-in connector and the mating plug-in connector relative to one another, wherein the mating plug-in connector is connected to the second fastening element in such a manner that the mating plug-in connector is displaceable along at least one translatory degree of freedom, and wherein the plug-in connector is connected to the first fastening element in such a manner that the plug-in connector is displaceable along a first translatory degree of freedom, and wherein the mating plug-in connector is connected to the second fastening element in such a manner that the mating plug-in connector is displaceable along a second translatory degree of freedom, wherein the first fastening element has a clearance for the plug-in connector, and/or the second fastening element has a clearance for the mating plug-in connector.

13. The plug-in connector arrangement as claimed in claim 12, wherein a) a plug-in connector housing of the plug-in connector has at least one guide groove and/or at least one guide rib for connecting the plug-in connector to the first fastening element;

and/or b) a mating plug-in connector housing of the mating plug-in connector has at least one guide groove and/or at least one guide rib for connecting the mating plug-in connector to the second fastening element.

14. The plug-in connector arrangement as claimed in claim 13, wherein the plug-in connector housing and/or of the mating plug-in connector housing have a) two linear guide grooves which lie opposite one another along the external circumference; or b) at least two linear a guide ribs which lie opposite one another along the external circumference; or c) an annular groove which encircles the external circumference in an annular manner; or d) at least one annular guide rib which encircles the external circumference in an annular manner.

15. The plug-in connector arrangement as claimed in claim 12, wherein the plug-in connector and the mating plug-in connector configure a precision guide so as to align a radial orientation of the plug-in connector relative to a radial orientation of the mating plug-in connector for plugging into one another contact elements of the plug-in connector and corresponding mating contact elements of the mating plug-in connector.

16. The plug-in connector arrangement as claimed in claim 15, wherein a magnetic arrangement is provided for configuring or facilitating the approximate guide and/or the precision guide.

* * * * *